United States Patent [19]
Willey

[11] Patent Number: 5,890,873
[45] Date of Patent: Apr. 6, 1999

[54] LABYRINTH SEAL FOR A TURBINE BUCKET COVER

[75] Inventor: Lawrence Donald Willey, Burnt Hills, N.Y.

[73] Assignee: General Electric Co., Schenectady, N.Y.

[21] Appl. No.: 910,316

[22] Filed: Aug. 13, 1997

[51] Int. Cl.$^6$ .............................. F01D 5/20; F01D 11/08; F03B 11/00
[52] U.S. Cl. ........................ 415/173.5; 277/303; 277/420
[58] Field of Search .............................. 415/173.5, 174.5, 415/230; 277/303, 347, 418, 419, 420

[56] References Cited

U.S. PATENT DOCUMENTS

| | | | |
|---|---|---|---|
| 1,505,647 | 8/1924 | Junggren | 415/174.5 X |
| 3,085,809 | 4/1963 | Cooper | 277/418 X |
| 4,420,161 | 12/1983 | Miller | 277/419 X |

FOREIGN PATENT DOCUMENTS 1159227  12/1963  Germany ............................ 415/173.5

OTHER PUBLICATIONS

"Thirty Years Experience with Integrally Shrouded Blades" Neumann et al.; 1989 Joint Power Generation Conference, Dallas, Texas.

Primary Examiner—John E. Ryznic
Attorney, Agent, or Firm—Nixon & Vanderhye

[57] ABSTRACT

A labyrinth bucket tip to stator segment seal is provided. The bucket cover includes radially outwardly projecting labyrinth teeth while the fixed segment contains radially inwardly projecting labyrinth teeth. The teeth are arranged in groups thereof with end teeth or repeating patterns of groups lying in radial registration with one another while teeth between the end teeth are radially misaligned to provide a vernier type arrangement. The inner teeth groups have reduced radial clearance relative to conventional practice. End teeth are provided for each array of teeth which project beyond the gap between the tips of the groups of teeth to form a conventional seal with radially opposing lands and conventional radial clearance. This design results in an improved labyrinth bucket tip seal having reduced leakage and minimal risk of performance deterioration due to rubs.

10 Claims, 3 Drawing Sheets

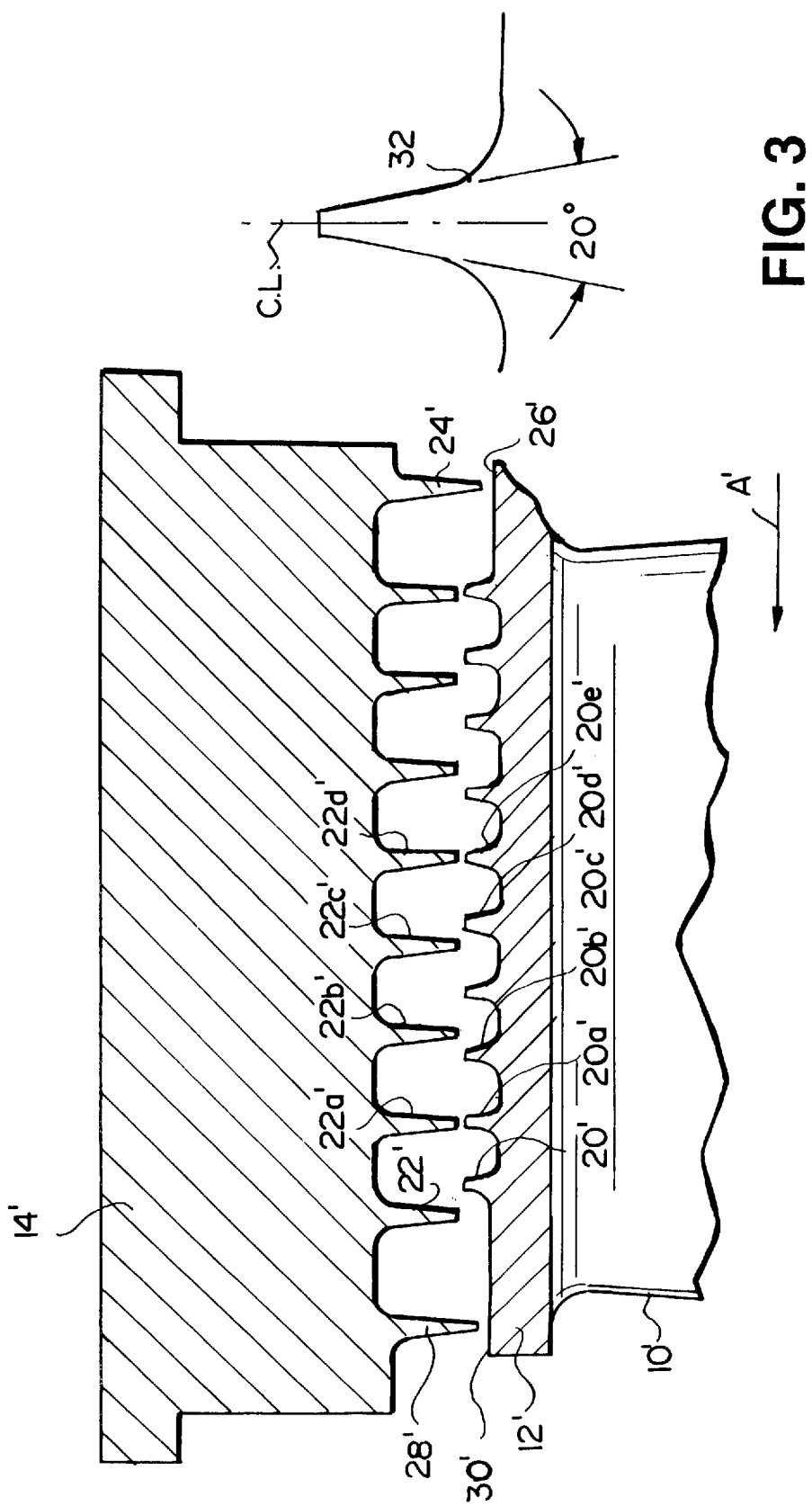

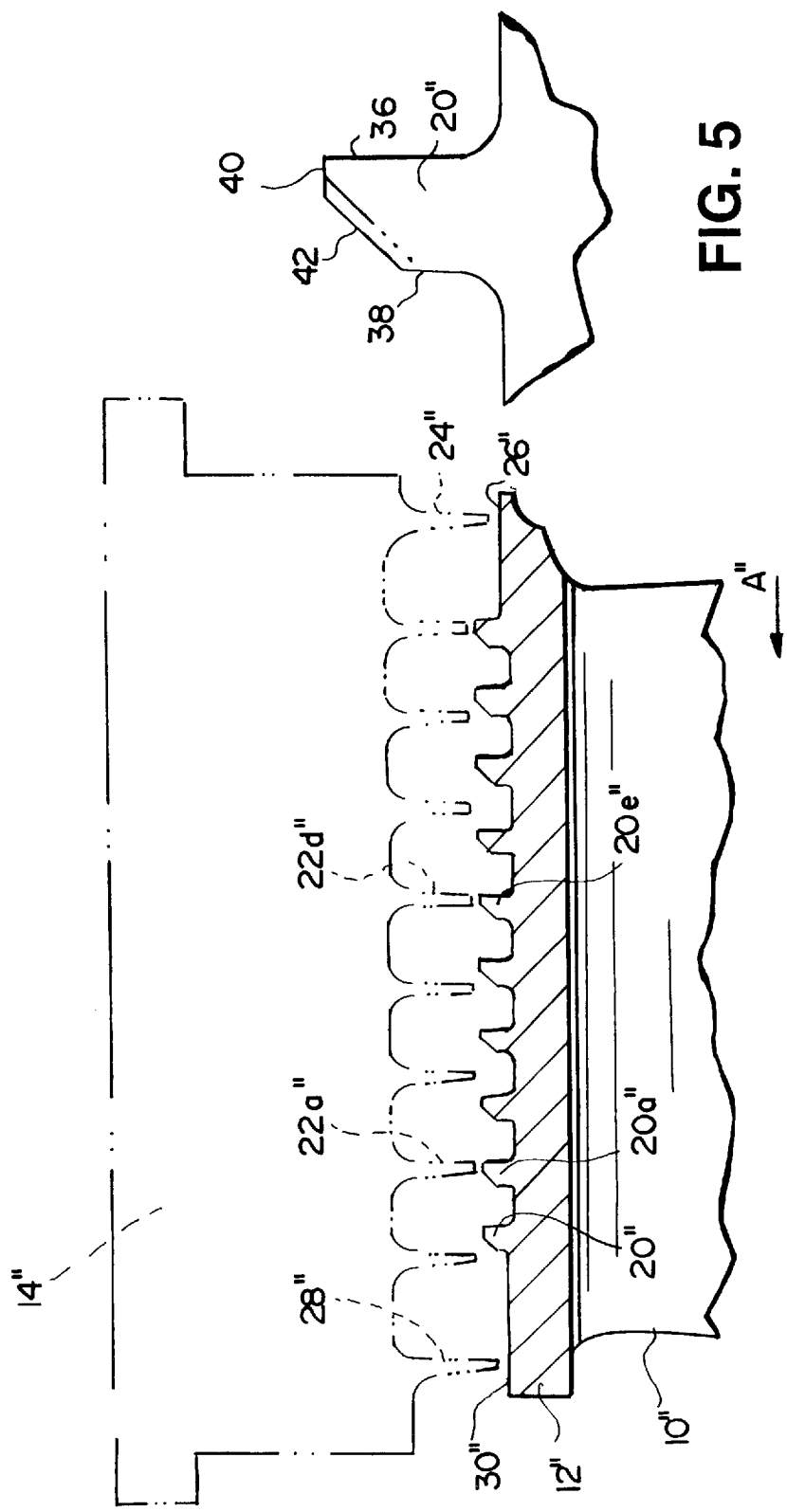

LABYRINTH SEAL FOR A TURBINE BUCKET COVER

TECHNICAL FIELD

The present invention relates to a seal between bucket tip covers and a stator segment for a turbine and particularly relates to a labyrinth type seal between rotating turbine bucket covers and stator segments to reduce bucket tip seal leakage and minimize performance deterioration due to potential rubs between the bucket cover and stator segment.

BACKGROUND

In many types of turbines, a cover is provided adjacent the tips of the buckets, the cover rotating with the buckets and in close proximity to a stator segment. The bucket covers may be mounted individually on each bucket tip or span a plurality of bucket tips. Leakage paths between the bucket covers and the stator segment reduce turbine performance and accordingly, various devices have been proposed and used to minimize such leakage paths. Ideally, brush type seals theoretically provide the best known seals. However, a brush seal at this location presently appears impractical because of the high surface speeds of the covers relative to the stator segment and potential brush bristle wear.

Labyrinth type seals have been proposed and used in the past to effect a seal at these locations. In one such arrangement, axially spaced, radially inwardly projecting teeth are formed on the stator segment and lie in radial opposition to a plurality of lands formed on the radially outer surface of the bucket cover. This is a three land concept known as a "W" cover seal.

Another type of seal provides for a plurality of axially spaced, radially inwardly projecting labyrinth teeth formed on the stator segment with the end teeth projecting radially inwardly further than the teeth between the end teeth. On the bucket, the cover has a central depression and a through opening. A pin internal to the bucket extends through the opening and is peened to retain the bucket cover on the bucket. The cover has lands between the end teeth of the stator segment adjacent the tips of the reduced length teeth. While this arrangement has been satisfactory, there remained the possibility of further reducing the leakage path without increasing the risk for performance deterioration due to rubbing.

Additionally, vernier type seals with labyrinth teeth in radial opposition to one another on the bucket cover and stator segment are known. See, for example, the paper entitled "Thirty Years Experience With Integrally Shrouded Blades", ASME Power Division 1989.

DISCLOSURE OF THE PRESENT INVENTION

In accordance with the present invention, there is provided a tip seal between rotating turbine buckets and stator segments which afford reduced leakage paths with minimal risk of reduced performance due to rubbing upon radial and axial excursions of the labyrinth teeth. Particularly, the bucket tips are provided with covers which have a first array of generally radially outwardly projecting, axially spaced teeth. A stator segment outwardly of the cover carries a second array of generally radially inwardly projecting, axially spaced teeth extending generally in radial opposition to the first array of teeth. First groups of teeth on the first and second arrays have a different number of teeth than one another. End teeth of a first group of teeth of each of the first and second arrays thereof lie in radial registration with one another, the teeth between the end teeth of each group lying in radial misalignment one with the other. Additionally, at least one end tooth of one of the arrays thereof projects radially beyond the tips of the teeth of that array to register with a radially opposing land. In this manner, the geometry of the teeth including the vernier relationships between the groups of teeth in radial opposition to one another tighten the clearances between the bucket cover and the segment beyond typical labyrinth type seals to afford a first order reduction of leakage. Moreover, if radial and/or axial excursions occur during operation, rubbing will take place only at one or more discrete locations.

In the present invention, the combination of the foregoing described geometry of the teeth and an end tooth of an array of teeth lying opposite a land enables the gap or leakage path to be considerably tightened up such that the magnitude of the leakage relative to a theoretical leakage with the best seal available, i.e., a brush seal approaches very closely to the minimal leakage of that best available seal.

In a preferred embodiment according to the present invention, there is provided a labyrinth bucket tip seal for a turbine comprising a generally circumferentially extending cover for the tip of a turbine bucket and carried for rotation with the bucket about an axis, the cover carrying a first array of generally radially outwardly projecting, axially spaced teeth, a generally circumferentially extending segment fixed from rotation in radial opposition to the bucket cover, the segment carrying a second array of generally radially inwardly projecting, axially spaced teeth extending generally in radial opposition to the first array of teeth, a first group of teeth of one of the first and second arrays of teeth having a number of teeth in excess of a number of teeth of a first group of teeth of another of the first and second arrays of teeth, end teeth of the first groups of teeth lying in radial registration with one another with teeth between the end teeth being radially misaligned with one another, one of the cover and the segment having an end tooth of an array thereof projecting radially beyond tips of teeth of another of the cover and the segment to register with a land on another cover and the segment.

Accordingly, it is a primary object of the present invention to provide a novel and improved labyrinth bucket tip seal having reduced leakage and minimal risk of performance deterioration due to rubs.

BRIEF DESCRIPTION OF THE DRAWINGS

FIG. 2 is a view similar to FIG. 1, illustrating a second embodiment of the present invention;

FIG. 3 is an enlarged schematic view of a tooth for the labyrinth seal of FIG. 2;

FIG. 4 is a view similar to FIG. 1, illustrating a further form of bucket tip seal; and FIG. 5 is an enlarged schematic view of a tooth for the labyrinth seal of FIG. 4.

BEST MODE FOR CARRYING OUT THE INVENTION

Figure 1:
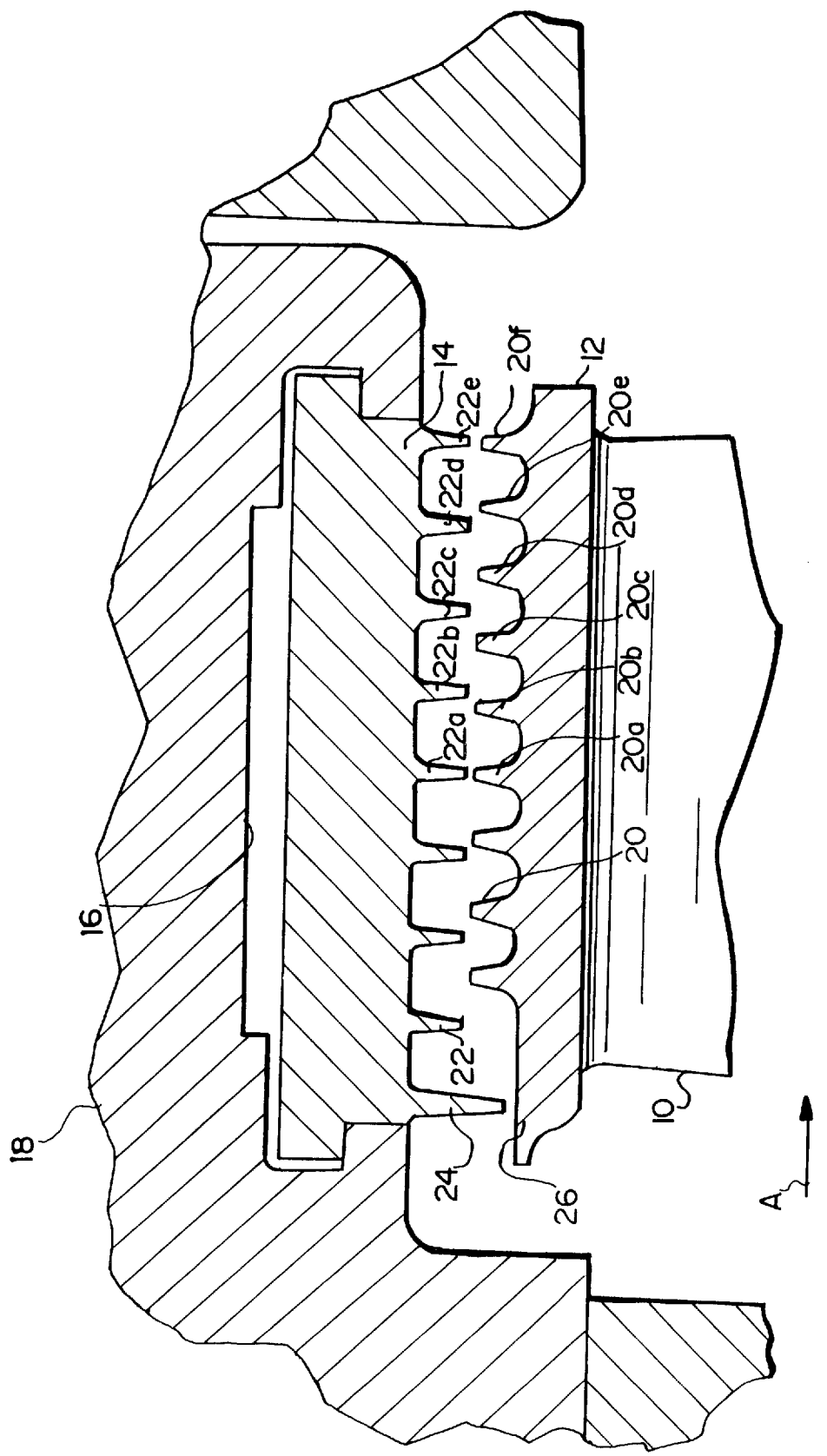
FIG. 1 is a fragmentary cross sectional view illustrating a bucket cover on a bucket tip in radial opposition to a stator segment illustrating the improved seal of the present invention.

Referring now to the drawings, particularly to FIG. 1, there is illustrated a turbine bucket 10 comprising one of a plurality of turbine buckets rotatable about an axis. The turbine bucket 10 mounts a bucket cover 12. The bucket cover 12 may comprise a single cover for each bucket 10 or a discrete cover which is secured to two or more adjacent buckets 10. In radial opposition to the bucket 12, there is provided a segment 14 which may be movable in a radial direction as those familiar with turbine technology will appreciate. The stator segment 14 is located in an arcuate slot 16 formed along the stator housing 18. In the embodiment illustrated in FIG. 1, the flow of gases is in the direction of the arrow A. It will be appreciated that the gap between the turbine bucket cover 12 and the stator segment 14 constitutes a leakage path for the gas flow and the magnitude of leakage flow affects the performance of the turbine. Consequently, it is highly desirable to minimize the leakage flow without causing rubs between the rotating and fixed parts upon radial or axial excursions of those parts.

In this first form of the invention, the bucket cover 12 has a first array of generally radially outwardly projecting, axially spaced teeth 20 formed along the radially outermost surface of the cover 12. The stator segment 14 includes a second array of generally radially inwardly projecting axially spaced teeth 22 in general opposition to the teeth 20 of the bucket cover 12. From FIG. 1, it will also be realized that there is a first group of teeth carried on one of the arrays of the teeth, i.e., the teeth 20 of bucket cover 12 which have a number of teeth in excess of a number of teeth of a first group of teeth of the opposite array of teeth, i.e., the teeth of the stator segment 14. Particularly, a first group of teeth 20 on bucket cover 12 may comprise the teeth 20a, 20b, 20c, 20d, 20e and 20f. A first group of teeth on the stator segment 14, in general opposition to the first group of teeth 20 on cover 12, may comprise teeth 22a, 22b, 22c, 22d and 22e. From a review of drawing FIG. 1, it will be appreciated that the end teeth of each of the groups of teeth 20a–20f and 22a–22e lie in radial registration with one another. That is, the end teeth 20a and 22a lie in radial alignment with one another at like axial positions while the end teeth 20f and 22e lie in radial alignment with one another at like axial positions, the teeth of each group between those end teeth being misaligned with the teeth of the opposing group. From this arrangement, it will be appreciated that any radial or axial excursion of the teeth would not result in rubbing with respect to the teeth intermediate the end teeth of these groups. To the extent rubbing may occur, it would occur only with respect to the end teeth of these groups. In the form of the invention illustrated in FIG. 1, the remaining teeth 20 and 22 on the bucket cover 12 and stator segment 14 are misaligned one with the other.

Additionally, there is provided an end tooth 24 on the stator segment 14 at the upstream end thereof. The end tooth 24 projects radially inwardly beyond the tips of the teeth 22 of segment 14 as well as the tips 20 of the bucket cover 12. The tip of the elongated end tooth 24 terminates short of an end land 26 on the bucket cover on the upstream end thereof. As explained below, the radial clearances between tips of the teeth 20 and 22 are greatly reduced with respect to conventional clearances. The clearance between the tip of the end tooth 24 and land 26 is greater than between teeth 20 and 22 and approximates a typical clearance between labyrinth teeth conventionally provided for this purpose.

Referring now to the embodiment illustrated in FIGS. 2 and 3 (wherein like reference numerals are applied to like parts as in the embodiment of FIG. 1 followed by a prime), there is provided a bucket cover 12' in radial opposition to a stator segment 14'. The bucket cover 12' includes an array of radially outwardly projecting, axially spaced labyrinth seal teeth 20' while the stator segment 14' includes a second array of generally radially inwardly projecting, axially spaced teeth 22' extending generally in radial opposition to the first array of teeth 20'. As in the prior embodiment, a first group of teeth, for example, teeth 20a', 20b', 20c', 20d' and 20e', have a number of teeth in excess of a number of teeth of a first group of teeth 22a', 22b', 22c' and 22d' on the stator segment 14', the end teeth of the first and second groups lying in radial registration with one another. As in the prior embodiment, it will be noted that the number of teeth in the first group on the bucket cover exceeds by one the number of teeth on the first group of the stator segment. It will be appreciated similarly as in all embodiments that the number of teeth in excess from one group to the next may be more than one, for example, two or three, i.e., a vernier relationship. Thus, similarly, as in FIG. 1, the end radially registering teeth 20a' and 22a' and 20e' and 22d' of these groups may, upon radial excursions, rub together with minimal effect on performance while the remaining radially misaligned teeth therebetween as well as the misaligned teeth among the remaining teeth of the first and second arrays thereof on the cover and segment clear one another.

As in the prior embodiment, there is provided on the fixed segment 14' an end tooth 24' which projects radially inwardly in opposition to a land 26' on the upstream side of the seal relative to the direction of flow A' indicated by the arrow. In this form, there is also provided an end tooth 28' on the downstream end of the segment 14' in opposition to a land 30'. The elongated teeth 24' and 28' are spaced from the lands 26' and 30' a conventional labyrinth seal distance while the gap between the remaining arrays of teeth is much reduced as set forth below.

Referring to FIG. 3, the teeth 20 and 22 are preferably tapered along axial sides thereof and are symmetrical about a centerline CL. Fillets 32 are provided along opposite sides of the teeth where the teeth join with the cover or segment.

Referring now to the embodiment hereof illustrated in FIGS. 4 and 5, wherein like reference numbers apply to like parts as in the previous embodiment followed by a double prime, there is illustrated a bucket 10" having a bucket cover 12" in radial opposition to a stator segment 14" having an arrangement of teeth identical to the arrangement of teeth 28' illustrated in FIG. 2. Similarly, as in the previous embodiments, there are groups of teeth along the fixed segment 14" and bucket cover 12" wherein end teeth of the groups radially register with one another with teeth therebetween being radially misaligned relative to one another. Thus, the teeth 20a" and 20e" on bucket cover 12" lie in radial alignment with teeth 22a" and 22d" of stator segment 14". The teeth between those end teeth are radially misaligned relative to one another.

In this form, however, the shape of the first array of teeth 20" is asymmetrical. Referring to FIG. 5, each tooth 20" includes a generally radially extending upstream surface 36, and a radially outwardly extending downstream surface 38 relative to the direction of the flow A". Between surfaces 36 and 38, each tooth 20" has a flat tip 40 and a tapered trailing surface 42 interconnecting tip 40 and surface 38. Preferably, the surface 42 lies at a 45 degree angle relative to both surfaces 36 and 38. Also, the trailing surface 42 is chamfered at a 45 degree angle as indicated by the dashed lines.

From the foregoing description of the three embodiments hereof, it will be appreciated that the repeating pattern of teeth of the groups of teeth in radial opposition to one another is at least one pitch different. This uniform relative pitch difference enables the seal to have a reduced radial clearance relative to conventional seals. The following table illustrates the advantages of the present invention:

| Tip Seal Conf. | Cq (--) | CL (in.) | Cq × CL | Leak(% Stg) | Rel. Leak (--) |
|---|---|---|---|---|---|
| Single Tooth | 0.58 | 0.030 | 0.0174 | 1.12–1.50 | 1.00 |
| "Best" ADSP | 0.31 | 0.030 | 0.0093 | 0.60–0.80 | 0.53 |
| Mod. Lab/Lab | 0.23 | 0.020 | 0.0046 | 0.30–0.39 | 0.26 |
| Theoretical BS | 0.10 | 0.030* | 0.0030 | 0.19–0.26 | 0.17 |

*Fictitious CL consistent with Cq = 0.10.

In the above table, the term "Cq" refers to an orifice or discharge coefficient, the term CL refers to the clearance; the term "Cq×CL" is the product of those terms; the fourth column labeled "Leak (% Stg)" refers to the leakage path seal as a percentage of leakage past the stage; and the final column labeled "Rel. Leak (--)" refers to a standard against which the other seals, the seal of the present invention and a theoretical brush seal may be measured against in terms of leakage. Thus, the table refers to a single tooth opposite a land, values are given for Cq, CL, Cq×CL and Leak (% Stage) and a relative leakage value of 1.00 is assigned for that configuration. For a prior seal considered the best available at the time, ("Best" ADSP) values are similarly given for Cq, CL, Cq×CL, Leak (% Stage) and leakage past the stage relative to the leakage past the stage using the single tooth type seal. The present invention is shown in the table beside the heading "Mod. Lab/Lab". The theoretical brush seal data is provided in the final line of the Table. Thus, it will be seen that the clearance between the group of teeth as explained above is 0.020 inches compared with the typical or conventional seal where the clearance is 0.030 inches. However, the relative leakage as comparing the seal of the present invention with a single tooth or the best previously available seal ("Best" ADSP) is set forth in the final column. It will be seen that the present invention has only approximately one-fourth the leakage relative to the leakage of a single seal tooth opposite a land and one-half the leakage of the best available prior labyrinth type seal ("Best" ADSP). The theoretical minimum leakage is given in the final column as 0.17 for a brush seal. Accordingly, the seal of the present invention approaches that theoretical limit in terms of its relative leakage much more closely than the best available seals and the single tooth seal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A labyrinth bucket tip seal for a turbine comprising:
    a generally circumferentially extending cover for the tip of a turbine bucket and carried for rotation with the bucket about an axis, said cover carrying a first array of generally radially outwardly projecting, axially spaced teeth;
    a generally circumferentially extending segment fixed from rotation in radial opposition to said bucket cover;
    said segment carrying a second array of generally radially inwardly projecting, axially spaced teeth extending generally in radial opposition to said first array of teeth;
    a first group of teeth of one of said first and second arrays of teeth having a number of teeth in excess of a number of teeth of a first group of teeth of another of said first and second arrays of teeth, end teeth of said first groups of teeth lying in radial registration with one another with teeth between said end teeth being radially misaligned with one another;
    one of said cover and said segment having an end tooth of an array thereof projecting radially beyond tips of teeth of another of said cover and said segment to register with a land on said another cover and said segment.

2. A seal according to claim 1 including a second group of teeth of said one of said first and second arrays of teeth having a number of teeth in excess of a number of teeth of a second group of teeth of said another of said first and second arrays of teeth, end teeth of said second groups of teeth lying in radial registration with one another with teeth between said end teeth of said second group of teeth being radially misaligned with one another.

3. A seal according to claim 2 wherein an end tooth of each said first and second groups of teeth on each of said first and second arrays of teeth comprises a single tooth on the respective arrays of teeth.

4. A seal according to claim 1 wherein the teeth of said first group on said one of said first and second arrays of teeth are radially spaced from the teeth of said first group on said another of said first and second arrays of teeth a radial distance less than the radial distance between the one end tooth in registration with said land.

5. A seal according to claim 1 wherein the teeth of at least one of said first and second arrays of teeth have tapering side surfaces facing in opposite axial directions.

6. A seal according to claim 1 wherein the teeth of each said first and second arrays thereof have tapering side surfaces facing in opposite axial directions.

7. A seal according to claim 1 wherein the teeth of at least one of said first and second arrays of teeth have an angled surface forming an acute angle with a radial plane passing through an axial end face of said teeth.

8. A seal according to claim 7 wherein said angled surface has a chamfer.

9. A seal according to claim 7 wherein the cover and the segment define a leakage path therebetween for flowing gas from an upstream side of said teeth to a downstream side of said teeth, said angled surface facing in the downstream direction of flow.

10. A seal according to claim 1 wherein the cover and the segment define a leakage path therebetween for flowing gas from an upstream side of said teeth to a downstream side of said teeth, said one of said cover and said segment having a second end tooth of an array thereof projecting radially beyond tips of teeth of another of said cover and said segment to register with a second land on said another cover of said segment, said end teeth of said one cover and said segment lying at axially opposite ends of said one cover and said segment with all other teeth of said arrays thereof lying axially therebetween.

* * * * *